(12) United States Patent
Mohtadi et al.

(10) Patent No.: US 11,811,020 B2
(45) Date of Patent: Nov. 7, 2023

(54) ELECTROLYTES WITH ULTRAHIGH CLOSO-BORATE CONCENTRATIONS

(71) Applicant: Toyota Motor Engineering & Manufacturing North America, Inc., Plano, TX (US)

(72) Inventors: Rana Mohtadi, Northville, MI (US); Oscar Tutusaus, Ann Arbor, MI (US); Michael John Counihan, Urbana, IL (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 280 days.

(21) Appl. No.: 17/165,230

(22) Filed: Feb. 2, 2021

(65) Prior Publication Data
US 2022/0246980 A1 Aug. 4, 2022

(51) Int. Cl.
*H01M 10/056* (2010.01)
*H01M 10/0562* (2010.01)
*H01M 10/0525* (2010.01)
*C07F 5/02* (2006.01)
*H01M 4/38* (2006.01)

(52) U.S. Cl.
CPC ......... *H01M 10/0562* (2013.01); *C07F 5/027* (2013.01); *H01M 4/382* (2013.01); *H01M 10/0525* (2013.01); *H01M 2300/0065* (2013.01)

(58) Field of Classification Search
None
See application file for complete search history.

(56) References Cited

U.S. PATENT DOCUMENTS

2020/0381776 A1 12/2020 Mohtadi et al.
2020/0381777 A1 12/2020 Mohtadi et al.
2020/0381778 A1 12/2020 Mohtadi et al.

FOREIGN PATENT DOCUMENTS

CA 2513918 A1 * 2/2006 ............. C07F 5/022
WO WO-2015139060 A1 * 9/2015 ......... B01J 31/2265

OTHER PUBLICATIONS

Lucia, L. et al., "Mixtures of Iconic Liquid—Alkylcarbonates as Electronlytes for Safe Linthium-icon Batteries", Journal of Power Sources 227 (2013) pp. 8-14.
Yunis, R. et al., "Plastic Crystals Utilising Small Ammonium Cations and Sulfonylimide Anions as Electrolytes for Lithium Batteries", J. Electrochem Soc 167 (2020) 14 pages.

* cited by examiner

*Primary Examiner* — Lucas J. O'Donnell
(74) *Attorney, Agent, or Firm* — Christopher G. Darrow; Darrow Mustafa PC

(57) ABSTRACT

An ultrahigh closo-borate concentration solid-state electrolyte is presented that is a combined salt of an alkali metal or alkali earth metal closo-borate and conductivity enhancing SISE. The combined salt allows significantly higher conductivities in the solid state than the included alkali metal or alkali earth metal closo-borate. The combined salt can be prepared by mechanical combination or combination in solution. The salts can be used in solid-state electrochemical devices.

18 Claims, 2 Drawing Sheets

ELECTROLYTES WITH ULTRAHIGH CLOSO-BORATE CONCENTRATIONS

TECHNICAL FIELD

The present disclosure generally relates to electrochemical cells and, more particularly, to electrolytes with boranyl salts for batteries.

BACKGROUND

Solid-state electrolytes provide many advantages in secondary battery design, including mechanical stability, no volatility, and ease of construction. Typical inorganic solid-state electrolytes having high ionic conductivity are hard materials that can fail due to insufficient contact with the electrode materials after battery cycling. Polymeric and other organic solid-state electrolytes overcome contact failure on cycling because of their "soft" nature. Unfortunately, these electrolytes typically display poor ionic conductivity.

Batteries based on the Li-ion rocking chair mechanism insert $Li^+$ ion into active materials during electrochemical reduction and extract the $Li^+$ ion during electrochemical oxidation. The repeated insertion and extraction of the $Li^+$ ions induce volume changes in the electrolyte and electrode materials. With liquid electrolyte batteries, the volume change of the active material has little effect on the capability of the electrolyte to transport $Li^+$ ions over time. However, with solid-state batteries, the solid-state electrolyte undergoes mechanical stress and physically degrades with the cracking of the solid electrolyte layer. The cracking of the electrolyte leads to battery failure by internal shorting or loss of conductivity of the solid electrolyte.

Soft ionic solid-state electrolytes (SISEs) based on SISEs, such as organic ionic plastic crystals (OIPCs), exhibit states that are intermediate between the extremes displayed by the inorganic electrolytes and the polymeric and organic solid-state electrolytes. The non-flammability, non-volatility, softness, and high electrochemical and thermal stability displayed by these SISEs provides great promise for battery applications. These SSEs can be further doped with lithium salts for use as lithium-ion conductors. The solubility of lithium salts in these SISEs is limited and the resulting $Li^+$ ion concentrations in a resulting composition below solubility limit are often insufficient to achieve the desired conductivities.

Accordingly, to realize robust and ultrahigh concentration solid-state electrolytes of lithium closo-borate salts in SISEs there remains a need to increase the concentration of lithium beyond saturation limits in the mixture molten state at elevated temperature, in a way that result in a solid-state electrolyte at room temperature that exhibits higher conductivity relative the parent starting material.

SUMMARY

Disclosed, in various non-limiting embodiments, are electrolytes having a combination of $LiCB_{11}H_{12}$ or other alkali metal or alkali earth metal closo-borate in at least one soft ionic solid-state electrolytes SISE having a closo-borate anion, where at least one SISE has an ammonium or phosphonium cation of the structure $[(CR^1R^2)_n]_w Z(R^3)_{4-2w}^+$ where: n is 4 to 6; w is 0 to 2; Z is N or P. The $R^1$ and $R^2$ groups are independently hydrogen, $C_1$-$C_8$ alkyl, $C_1$-$C_8$ alkoxy, $C_6$-$C_{14}$ aryl, or $C_6$-$C_{14}$ aryloxy, where the carbons are unsubstituted or substituted one or more times with fluorine, alkyl, partially fluorinated or perfluorinated alkyl, alkoxy, partially fluorinated or perfluorinated alkoxy, phenyl, partially fluorinated or perfluorinated phenyl, phenoxy, or partially fluorinated or perfluorinated phenoxy, and where any alkyl or alkoxy group is linear, branched, or cyclic. $R^3$ groups are independently $C_1$-$C_8$ alkyl or $C_6$-$C_1$ aryl where the carbons are unsubstituted or substituted one or more times with fluorine, alkyl, partially fluorinated or perfluorinated alkyl, alkoxy, partially fluorinated or perfluorinated alkoxy, phenyl, partially fluorinated or perfluorinated phenyl, phenoxy, or partially fluorinated or perfluorinated phenoxy, and where any alkyl or alkoxy group is linear, branched, or cyclic. When w is 0 or 1, the $R^3$ groups can include at least two different structures or, when all $R^3$ groups are the same, $R^3$ group contains a chiral center but the combined $R^3$'s is racemic. When w is 2, the two $[(CR^1R^2)_n]Z^+$ cyclic structures of the spiro-ammonium or phosphonium ion can be different or, when the two $[(CR^1R^2)_n]Z^+$ cyclics are the same, at least one of the $CR^1R^2$ has different $R^1$ and $R^2$ groups and the $R^1$ and $R^2$ groups are randomly situated on both faces of the structure, for example randomly situated in axial and equatorial position of n=5 cyclic. The Z atom can be, but is not necessarily, a chiral center or any of $R^1$, $R^2$ or $R^3$ groups can be, but is not necessarily, chiral centers. The $Li^+$ concentration, an ultrahigh concentration, exceeds the solubility of the lithium closo-borate salt in the SISE when processed without a prolonged heating of the mixture at a high temperature and displays a room temperature conductivity that is greater than that of the neat lithium closo-borate salt.

One embodiment, provided herein, is a method to prepare $LiCB_{11}H_{12}$ salt or other alkali metal or alkali earth metal closo-borate combined at an ultrahigh concentration in a mixture with at least one SISE that is an ammonium or phosphonium $CB_{11}H_{12}$ salt. An ultrahigh concentration is a concentration beyond the saturation concentration of the Li salt in the liquid phase mixture with the SISE. The lithium closo-borate salt is combined with the SISE, heated to at least 160° C. to form a mixture, and held at that temperature for a period. The period is sufficient to form a partially fluid phase or composition. The mixture can be stirred to improve mixing between its components. Without achieving the high temperature or by not maintaining the temperature for a sufficient period, the mixture will contain some portion of starting salts upon cooling when, for example, the $LiCB_{11}H_{12}$ exceeds about 45 mole percent.

In one embodiment, provided herein, the ultrahigh concentration alkali metal or alkali earth metal closo-borate/SISE mixture is a solid-state electrolyte for a solid-state electrochemical device. Accordingly, provided herein, is an electrochemical device that includes an anode; a cathode; and an ultrahigh concentrated alkali metal or alkali earth metal closo-borate/SISE mixture that is a solid-state electrolyte in contact with the anode and the cathode. The electrochemical device can be a secondary battery or a subunit of a secondary battery. The anode is an electrode that undergoes oxidation during the device's discharge and at which reduction occurs during the device's charge. Similarly, the cathode is an electrode where a cathode material reduction occurs during the device's discharge and a cathode material oxidation occurs during the device's charge.

These and other features of the electrolyte and its preparation will become apparent from the following detailed description when read in conjunction with the figures and examples, which are exemplary, not limiting.

BRIEF DESCRIPTION OF THE DRAWINGS

For a better understanding of the processes and devices having an ultrahigh concentration lithium containing electrolyte, with regard to the particular variations and examples discussed herein, reference is made to the accompanying figures, in which.

Figure 1:
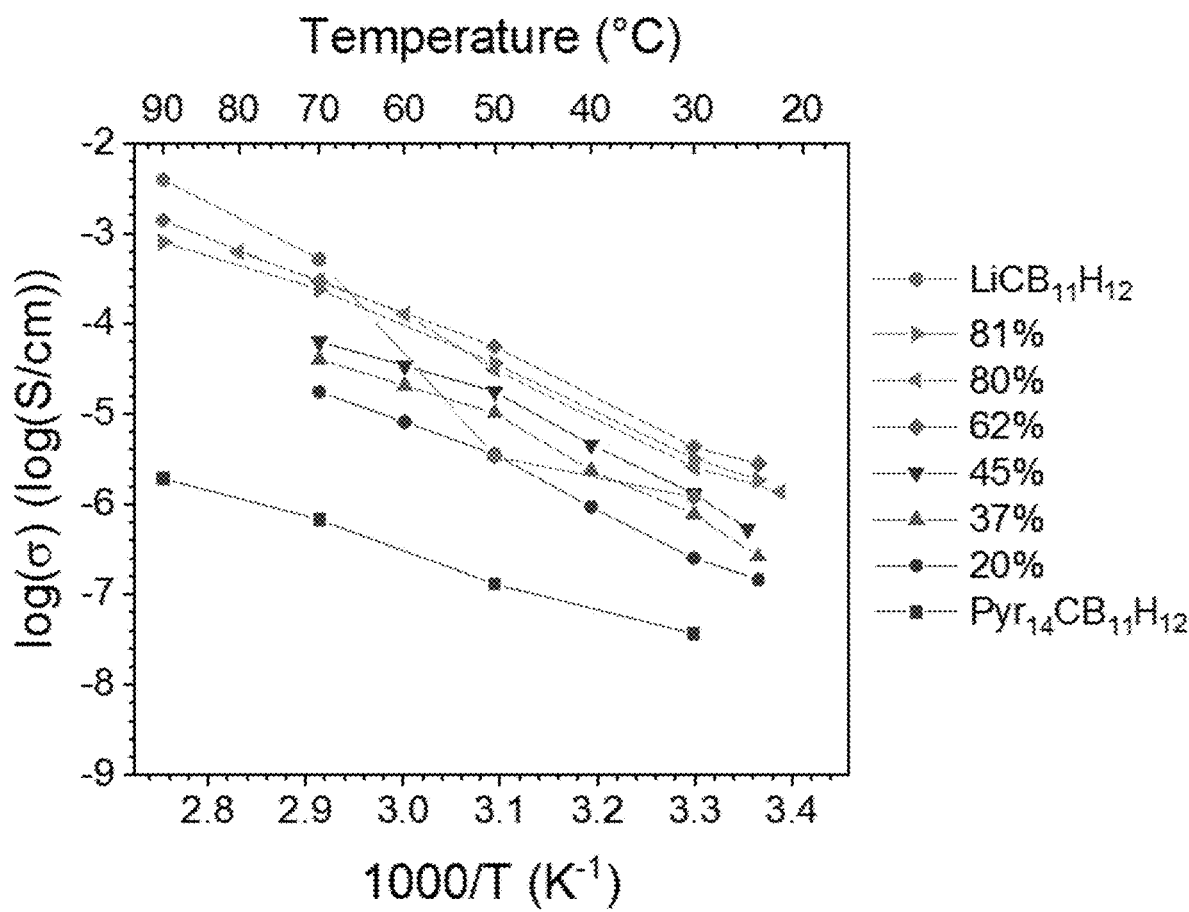
FIG. 1 shows a composite Arrhenius plot of the conductivities of a $LiCB_{11}H_{12}$ at 100, 81, 80, 62, (ultrahigh concentrations), 45, 37, 20, and 0 mole percent in the organic ionic plastic crystal (SISE) such as $Pyr_{14}CB_{11}H_{12}$ where the combined salt's ionic conductivity is higher than that of the neat $LiCB_{11}H_{12}$ (●) at temperatures below about 70° C.

It should be noted that the figures set forth herein is intended to exemplify the general characteristics of the methods and devices among those of the present technology, for the purpose of the description of certain aspects. The figure may not precisely reflect the characteristics of any given aspect and are not necessarily intended to define or limit specific embodiments within the scope of this technology.

DETAILED DESCRIPTION

The present disclosure provides an ultrahigh concentration lithium solid-state electrolyte, other alkali metal electrolyte, or alkali earth metal electrolyte, where a $LiCB_{11}H_{12}$, other alkali metal, or alkali earth metal closo-borate is included with at least one organic ionic plastic crystal (SISE) or SISE-like material. The lithium closo-borate is included at concentrations higher than the saturation concentration for a solution formed upon mixing of the components in a molten state. As used herein, the SISE can be a SISE-like component that has a long-range order but short-range disorder that can originate from rotational motions of the molecules that occurs with one or more solid-solid phase transitions that permits the onset of these molecular rotations. Any reference herein to an SISE can be to compositions that might be characterized traditionally as a solid electrolyte (SE) and/or SISE-like material, and SISEs include the compositions disclosed herein without implying that the SISEs herein has the specific properties of traditional SISEs. In addition to $CB_{11}H_{12}^{-1}$, the closo-borate anion can be $B_{12}H_{12}^{-2}$ or any substituted derivative thereof.

The closo-borate anions have any of the structures: $[B_y H_{(y-z-i)}R_zX_i]^{-2}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$ or $[C_2B_{(y-3)}H_{(y-t-j-1)}R_tX_j]^{-2}$, where: y is 6 to 12; z is 0 to y; i is 0 to y–z; t is 0 to (y–1); j is 0 to (y–1–t); and X is independently halogen; and R is independently alkyl, alkoxy, aryl, alkylaryl, arylalkyl, or aryloxy, where the alkyl can be linear, branched, or cyclic, and wherein any R is unsubstituted, partially fluorinated, or fully fluorinated. The halogen can be F, Cl, Br, or I.

The SISE has a closo-borate anion with an ammonium or phosphonium cation of the structure $[(CR^1R^2)_n]_wZ(R^3)_{4-2w}^+$ where: n is 4 to 6; w is 0 to 2; Z is N or P. The $R^1$ and $R^2$ groups are independently hydrogen, $C_1$-$C_8$ alkyl, $C_1$-$C_8$ alkoxy, $C_6$-$C_{14}$ aryl, or $C_6$-$C_{14}$ aryloxy, where the carbons are unsubstituted or substituted one or more times with fluorine, alkyl, partially fluorinated or perfluorinated alkyl, alkoxy, partially fluorinated or perfluorinated alkoxy, phenyl, partially fluorinated or perfluorinated phenyl, phenoxy, or partially fluorinated or perfluorinated phenoxy, and where any alkyl or alkoxy group is linear, branched, or cyclic. $R^3$ groups are independently $C_1$-$C_8$ alkyl or $C_6$-$C_{14}$ aryl where the carbons are unsubstituted or substituted one or more times with fluorine, alkyl, partially fluorinated or perfluorinated alkyl, alkoxy, partially fluorinated or perfluorinated alkoxy, phenyl, partially fluorinated or perfluorinated phenyl, phenoxy, or partially fluorinated or perfluorinated phenoxy, and where any alkyl or alkoxy group is linear, branched, or cyclic. When w is 0 or 1, the $R^3$ groups can include at least two different structures or when all $R^3$ groups are the same, $R^3$ group contains a chiral center but the combined $R^3$'s is racemic. When w is 2, the two $[(CR^1R^2)_n]Z^+$ cyclic structures of the spiro-ammonium or phosphonium ion can be different or, when the two $[(CR^1R^2)_n]Z^+$ cyclics are the same, at least one of the $CR^1R^2$ has different $R^1$ and $R^2$ groups and the $R^1$ and $R^2$ groups are randomly situated on both faces of the structure, for example randomly situated in axial and equatorial position of n=5 cyclic. The Z atom can be, but is not necessarily, a chiral center or any of $R^1$, $R^2$, or $R^3$ groups can be, but is not necessarily, chiral centers. A partially fluorinated alkyl, alkoxy, phenyl or phenoxy group is one where less than all the hydrogens have been substituted with fluorine. The ultrahigh concentration lithium electrolyte is a mixture that is processed in at least a partially molten state at a high temperature and displays a higher conductivity than the neat lithium closo-borate or a saturated solution formed at high temperature molten state mixing. The ultrahigh concentration electrolyte is readily pressed under relatively modest uniaxial pressures to form a layer structure, such as a pellet. The electrolyte composition has an equal or greater mole fraction of lithium closo-borate in the SISE. For example, the lithium closo-borate to SISE material molar ratio can be 1:1, 2:1, 3:1, 4:1, or greater.

In other embodiments, the lithium closo-borate can be replaced with a sodium closo-borate, magnesium closo-borate or any other alkali metal closo-borate or alkali earth metal closo-borate for use as electrolytes for sodium batteries, magnesium batteries or any alkali or alkali earth metal battery. The SISE or SISE-like material can be as those employed with lithium closo-borate. In other embodiments of the invention, the closo-borate anion of the SISE can be substituted by or combined with a triflate anion, bis(trifluoromethanesulfonyl)imide anion, bis(fluorosulfonyl)imide anion, tetrafluoroborate anion, hexafluorophosphate anion, or in any combination thereof. Throughout the remaining specification, it should be understood that lithium closo-borate can be replaced with any alkali or alkali earth metal closo-borate, and that the SISE is not exclusive of anions other that closo-borate.

In one embodiment, the ultrahigh concentration lithium electrolyte is formed as a layer. In this method, the lithium closo-borate and at least one SISE are combined as solids that are ground or milled to form a mixed powder. The mixed powder is heated to a temperature of at least 160° C. where a fluid state, such as a molten or partially molten state is achieved. The fluid state can be stirred or otherwise agitated for a sufficient period, for example, more than one hour, to give a mixture that upon cooling to room temperature is sufficiently malleable to be pressed into a layer under relatively modest pressures. The pre-heated mixture can be mechanically milled or otherwise ground to yield a combined lithium closo-borate-SISE-liked mixed salt into particles that have micrometer or nanometer dimensions. Ball milling, jet milling and other milling or grinding techniques can be applied to achieve a good dispersion of the two or more salts. After blending of the particles, heating is applied to render the mixture fluid and stirring can be performed to promote diffusion of the SISE or SISE-like into the continuous lithium closo-borate/SISE composition. These compositions can be converted into a solid electrolyte layer for inclusion into a battery or other electrochemical device under a relatively modest pressure, using a press or using a roller to provide a form that can be inserted into the electrochemical device.

In one embodiment, the ultrahigh concentration lithium electrolyte is included in an electrochemical device, such as a secondary battery or a subunit of a secondary battery. The anode is an electrode where oxidation occurs during the device's discharge and at which reduction occurs during the device's charge. Similarly, the cathode is an electrode where a cathode material reduction occurs during the device's discharge and a cathode material oxidation occurs during the device's charge.

The anode can include any material or combination of materials effective to participate in electrochemical oxidation of the metal during the device's discharge. Similarly, the anode can include any material or combination of materials effective to participate in electrochemical reduction of the lithium cations and to incorporate reduced lithium during a device's charge. In embodiments, the anode can consist essentially of elemental lithium or comprise at least one surface layer of elemental lithium.

The cathode can include any material or combination of materials that undergoes electrochemical insertion of a cathode material during the device's discharge. Similarly, the cathode can include any material or combination of materials for electrochemical extraction of the cathode material during the device's charge. In some variations, the cathode material that is inserted at the cathode during a device discharge and extracted from the cathode during device charging event can include lithium. The cathode can also include any material capable of storing the cation through a conversion mechanism.

The ultrahigh concentration lithium electrolyte that is formed by combining the SISE or SISE-like material with a lithium closo-borate, such as $LiCB_{11}H_{12}$, can display a conductivity a room temperature that is more than twice the conductivity of the neat lithium closo-borate or of a saturated solution of the lithium closo-borate in the SISE. As can be seen in FIG. 1, the conductivity of $Li^+$ at room temperature is about equivalent for the neat $LiCB_{11}H_{12}$ and the saturated solution, about 45 mole % $LiCB_{11}H_{12}$, in N-butyl-N-methylpyrrolidinium 1-carba-closododecaborate ($Py_{14}CB_{11}H_{12}$). A composition that is 80 mole % $LiCB_{11}H_{12}$ in $Py_{14}CB_{11}H_{12}$ formed upon processing at temperatures of at or above 160° C. for more than an hour displays an approximately two-fold higher conductivity over that of neat $LiCB_{11}H_{12}$ at room temperature and displays a higher conductivity at temperatures below about 60° C. than does neat $LiCB_{11}H_{12}$.

Figure 2:
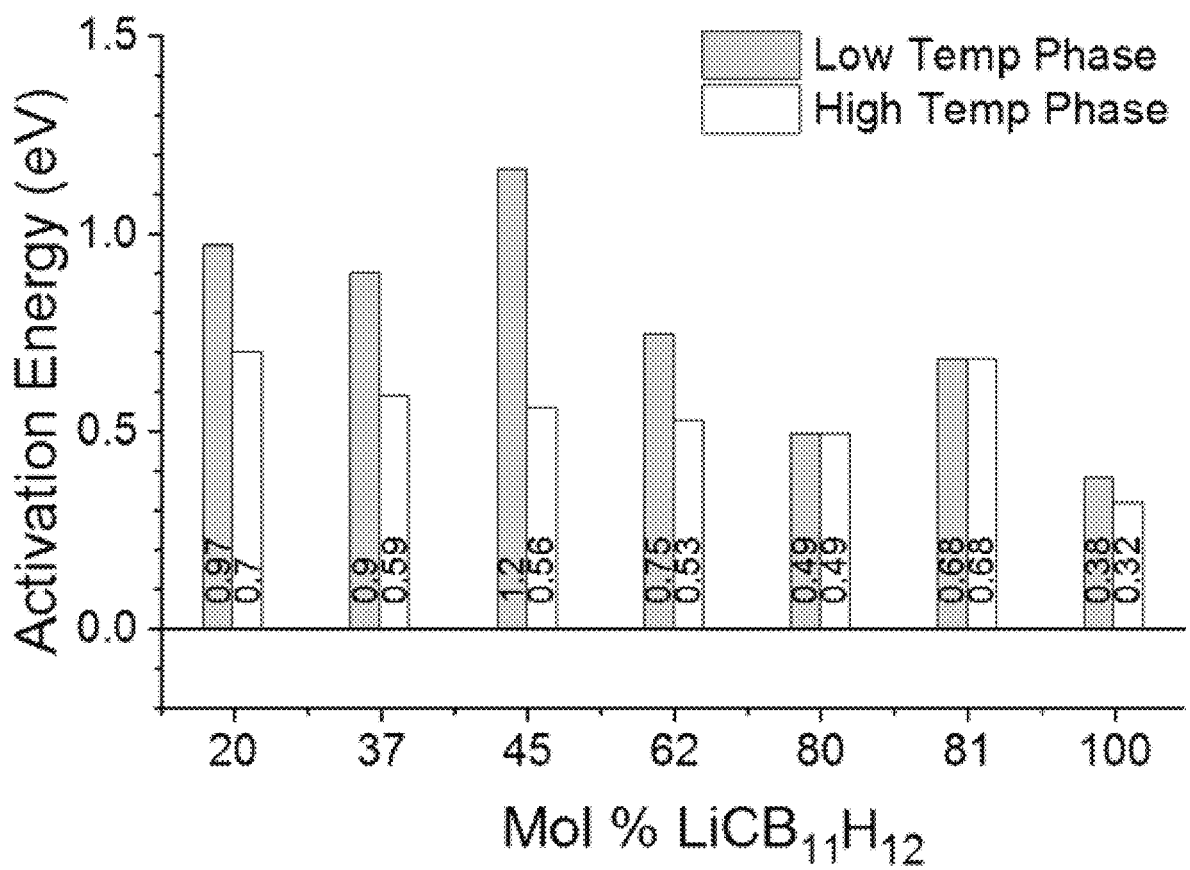
FIG. 2 shows a bar chart of the activation energies for $Li^+$ conductance of homogeneous mixtures, where a low temperature phase reflects the slope at lower temperatures in the plot of FIG. 1 and the high temperature phase reflects the slope at higher temperatures.

The ability to make a mixture beyond the solubility limit of the lithium closo-borate salt in a solute and achieve a conductivity that is significantly greater than the weighted average of the neat lithium closo-borate and the saturated solution was unexpected. This appears to indicate formation of new phases and not a dispersion of individual islands of lithium closo-borate salt in contact with a saturated solution of lithium closo-borate dissolved in an SISE. The SISE or SISE-like material forms a different phase that is effectively the SISE "dissolved" in the lithium closo-borate. The formation of the different phase is apparent from the activation energy of Li mobility which is distinct from the Li salt or other compositions that are at or below the saturation solubility limit. The phase that is formed provides a material having a lower activation energy for $Li^+$ migration than those compositions prepared within the saturation concentration's limit, displaying greater ion mobility at all concentrations below 100 mole percent for materials formed upon heating of $LiCB_{11}H_{12}/Py_{14}CB_{11}H_{12}$ mixtures, as indicated in FIG. 2.

Various aspects of the present disclosure are further illustrated with respect to the following Example. It is to be understood that this Example is provided to illustrate specific embodiments of the present disclosure and should not be construed as limiting the scope of the present disclosure in or to any particular aspect.

Example 1. Preparation of $LiCB_{11}H_{12}/Py_{14}CB_{11}H_{12}$ $LiCB_{11}H_{12}$ was combined with $Py_{14}CB_{11}H_{12}$ in a mortar at an 80:20 molar ratio. The combined salts were ground with a pestle until a homogeneous particulate mixture formed. The mixture was transferred to a vessel for heating to 160° C. for 24 hours. The partially molten mixture was stirred to form a mixture. Upon cooling the $LiCB_{11}H_{12}/Py_{14}CB_{11}H_{12}$ mixture to room temperature. The mixture was placed in a press and compressed to a pellet at 3 tons. Its conductivity was measured at various temperatures, as indicated in FIG. 1.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should also be understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A solid-state electrolyte comprising:
a combined salt comprising:
an ultrahigh concentration of an alkali metal or alkali earth metal closo-borate salt in a liquid mixture of the alkali metal or alkali earth metal closo-borate salt and at least one soft ionic solid-state electrolyte (SISE), the alkali metal or alkali earth metal closo-borate salt comprising lithium, sodium, potassium, or magnesium paired with at least one closo-borate anion, the at least one SISE comprising at least one organic cation coupled with the at least one closo-borate anion;
a conductivity, at room temperature, exceeding a conductivity of the alkali or alkali earth metal closo-borate salt and a conductivity of a saturated solution of the alkali or alkali earth metal closo-borate salt in the SISE.

2. The solid-state electrolyte according to claim 1, wherein the at least one closo-borate anion has a structure:

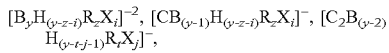

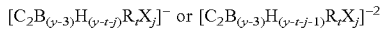

where:
y is 6 to 12;
z is 0 to y;
i is 0 to y–z;
t is 0 to (y–1);
j is 0 to (y–1–t);
X is independently halogen; and
R is independently alkyl, alkoxy, aryl, alkylaryl, arylalkyl, or aryloxy,
where the alkyl can be linear, branched, or cyclic, and wherein any R is unsubstituted, partially fluorinated, or fully fluorinated.

3. The solid-state electrolyte according to claim 2 further comprising the at least one organic cation coupled with a triflate anion, a tetrafluoroborate anion, a bis(trifluoromethanesulfonyl)imide anion, a bis(fluorosulfonyl)imide anion, a hexafluorophosphate anion, or any combination thereof.

4. The solid-state electrolyte according to claim 3, wherein the at least one organic cation is selected from ammonium or phosphonium ions having a structure:

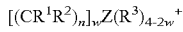

where:
n is 4 to 8;
w is 0 to 2;
Z is N or P; and
$R^1$ and $R^2$ are independently hydrogen, $C_1$-$C_8$ alkyl, $C_1$-$C_8$ alkoxy, $C_6$-$C_{14}$ aryl, or $C_6$-$C_{14}$ aryloxy, where carbons are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy, or monofluorinated to perfluorinated phenoxy, and where any alkyl or alkoxy group is linear, branched, or cyclic, and wherein a conductivity of a combined salt at room temperature exceeds a conductivity of the alkali or alkali earth metal closo-borate salt at room temperature and a conductivity of a mixed salt at a molar ratio of a saturated solution of the alkali or alkali earth metal closo-borate salt in the SISE, and $R^3$ is independently $C_1$-$C_8$ alkyl or $C_6$-$C_{14}$ aryl unsubstituted or substituted one or more times with fluorine, alkyl, partially fluorinated alkyl, perfluorinated alkyl, alkoxy, partially fluorinated alkoxy, perfluorinated alkoxy, phenyl, partially fluorinated phenyl, perfluorinated phenyl, phenoxy, partially fluorinated phenoxy, perfluorinated phenoxy, and where any alkyl or alkoxy group is linear, branched or cyclic.

5. The solid-state electrolyte according to claim 1, wherein the alkali metal or alkali earth metal closo-borate salt is a lithium closo-borate salt.

6. The solid-state electrolyte according to claim 5, wherein lithium closo-borate salt is $LiCB_{11}H_{12}$ and wherein the SISE is N-butyl-N-methylpyrrolidinium 1-carba-closododecaborate ($Py_{14}CB_{11}H_{12}$).

7. The solid-state electrolyte according to claim 5, wherein a molar ratio of the lithium closo-borate salt to the SISE is greater than 1:1.

8. The solid-state electrolyte according to claim 5, wherein a molar ratio of lithium closo-borate salt to the SISE is at least 4:1.

9. The solid-state electrolyte according to claim 5, wherein the conductivity at room temperature is at least twice the conductivity of the lithium closo-borate salt at room temperature.

10. An electrochemical device comprising:
an ultrahigh closo-borate concentration solid-state electrolyte comprising:
an ultrahigh concentration of an alkali metal or alkali earth metal closo-borate salt in a liquid mixture of the alkali metal or alkali earth metal closo-borate salt and at least one soft ionic solid-state electrolyte (SISE), the alkali metal or alkali earth metal closo-borate salt comprising lithium, sodium, potassium, or magnesium paired with at least one closo-borate anion, the at least one SISE comprising at least one organic cation coupled with the at least one closo-borate anion;
a conductivity, at room temperature, exceeding a conductivity of the alkali or alkali earth metal closo-borate salt and a conductivity of a saturated solution of the alkali or alkali earth metal closo-borate salt in the SISE; and
an anode comprising the alkali metal or alkali earth metal, intercalation, conversion, alloy materials; and
a cathode;
a conductivity at room temperature exceeding a conductivity of a saturated solution of the alkali or alkali earth metal closo-borate salt in the SISE at room temperature.

11. The electrochemical device according to claim 10, wherein the at least one closo-borate anion has a structure:

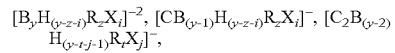

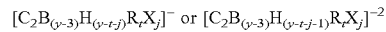

where:
y is 6 to 12;
z is 0 to y;
i is 0 to y−z;
t is 0 to (y−1);
j is 0 to (y−1−t);
X is independently halogen; and
R is independently alkyl, alkoxy, aryl, alkylaryl, arylalkyl, or aryloxy,
where the alkyl can be linear, branched, or cyclic, and wherein any R is unsubstituted, partially fluorinated, or fully fluorinated.

12. The electrochemical device according to claim 11 further comprising the at least one organic cation coupled with a triflate anion, a tetrafluoroborate anion, a bis(trifluoromethanesulfonyl)imide anion, a bis(fluorosulfonyl)imide anion, a hexafluorophosphate anion, or any combination thereof.

13. The electrochemical device according to claim 12, wherein the at least one organic cation is selected from ammonium or phosphonium ions having a structure:

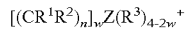

where:
n is 4 to 8;
w is 0 to 2;
Z is N or P; and
$R^1$ and $R^2$ are independently hydrogen, $C_1$-$C_8$ alkyl, $C_1$-$C_8$ alkoxy, $C_6$-$C_{14}$ aryl, or $C_6$-$C_{14}$ aryloxy, where carbons are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy, or monofluorinated to perfluorinated phenoxy, and where any alkyl or alkoxy group is linear, branched, or cyclic, and wherein a conductivity of a combined salt at room temperature exceeds a conductivity of the alkali or alkali earth metal closo-borate salt at room temperature and a conductivity of a mixed salt at a molar ratio of a saturated solution of the alkali or alkali earth metal closo-borate salt in the SISE, and $R^3$ is independently $C_1$-$C_8$ alkyl or $C_6$-$C_{14}$ aryl unsubstituted or substituted one or more times with fluorine, alkyl, partially fluorinated alkyl, perfluorinated alkyl, alkoxy, partially fluorinated alkoxy, perfluorinated alkoxy, phenyl, partially fluorinated phenyl, perfluorinated phenyl, phenoxy, partially fluorinated phenoxy, perfluorinated phenoxy, and where any alkyl or alkoxy group is linear, branched or cyclic.

14. The electrochemical device according to claim 13, wherein the alkali metal or alkali earth metal closo-borate salt is a lithium closo-borate salt.

15. The electrochemical device according to claim 14, wherein lithium closo-borate salt is $LiCB_{11}H_{12}$ and wherein the SISE is N-butyl-N-methylpyrrolidinium 1-carba-closododecaborate ($Py_{14}CB_{11}H_{12}$).

16. The electrochemical device according to claim 14, wherein a molar ratio of the lithium closo-borate salt to the SISE is greater than 1:1.

17. The electrochemical device according to claim 14, wherein a molar ratio of lithium closo-borate salt to the SISE is at least 4:1.

18. The electrochemical device according to claim 14, wherein the conductivity at room temperature is at least twice the conductivity of the lithium closo-borate salt at room temperature.

* * * * *